United States Patent

[11] 3,580,588

| [72] | Inventors | Howard L. Allen; |
| | | Charles D. De Graff, North Canton, Ohio |
| [21] | Appl. No. | 826,798 |
| [22] | Filed | May 22, 1969 |
| [45] | Patented | May 25, 1971 |
| [73] | Assignee | The Hoover Company |
| | | North Canton, Ohio |

[54] MOTOR-PUMP SHAFT SEAL
5 Claims, 5 Drawing Figs.

[52] U.S. Cl. .................................................... 277/32,
277/58, 15/412, 415/170
[51] Int. Cl. .................................................... F16j 9/00,
F16j 15/00
[50] Field of Search ........................................ 277/32, 12,
58; 415/170; 15/412

[56] References Cited
UNITED STATES PATENTS

| 3,379,444 | 4/1968 | Brummer et al. | 277/58 |
| 3,407,994 | 10/1968 | McKinney | 415/170 |

*Primary Examiner*—Sanuel B. Rothberg
*Attorneys*—Alfred G. Gross and Alan G. Paul

ABSTRACT: An integral motor-pump of a wet pickup floor conditioner has a housing comprising pump and motor chambers. The housing is generally divided along a plane forming two housing sections each having an integral web portion extending between the pump and motor chamber portions therein. When the housing sections are assembled the mating web portions define a barrier wall having an aperture through which an output shaft, from a motor mounted in the motor chamber, extends. A groove is formed in the planar mating surface of each of the housing sections around the pump chamber. The grooves in the mating surfaces are each connected at their ends by a groove portion in the periphery or boundary edge of the opening in the respective web. A substantially continuous elastomeric sealing means is fitted in each groove. An impeller-fan unit, rotatably carrying a sealing disc between a motor-cooling fan and a pump impeller is mounted on the motor shaft. When assembled in the housing the impeller is located in the pump chamber and the motor-cooling fan located in the motor chamber, with the sealing disc extending into the groove portions in the periphery of the aperture in the barrier wall, in contact with the elastomeric seal therein. The disc is generally circular in shape with diametrically opposed tapered extensions mating with complementary-shaped groove portions at the intersections of the aperture and the adjacent planar mating surfaces of the web. A generally circular, axially offset, portion of the disc lies within the circular aperture and has a pair of diametrically opposed ears. Each ear has a flat, the flats lying flush against planar surfaces of the web of one of the housing sections adjacent the aperture. Arcuate opposing surfaces on the ears cooperate with camming cutouts in the internal web of the other housing section at the intersection of the planar mating surfaces and the central aperture to center the sealing disc in the aperture in the barrier wall.

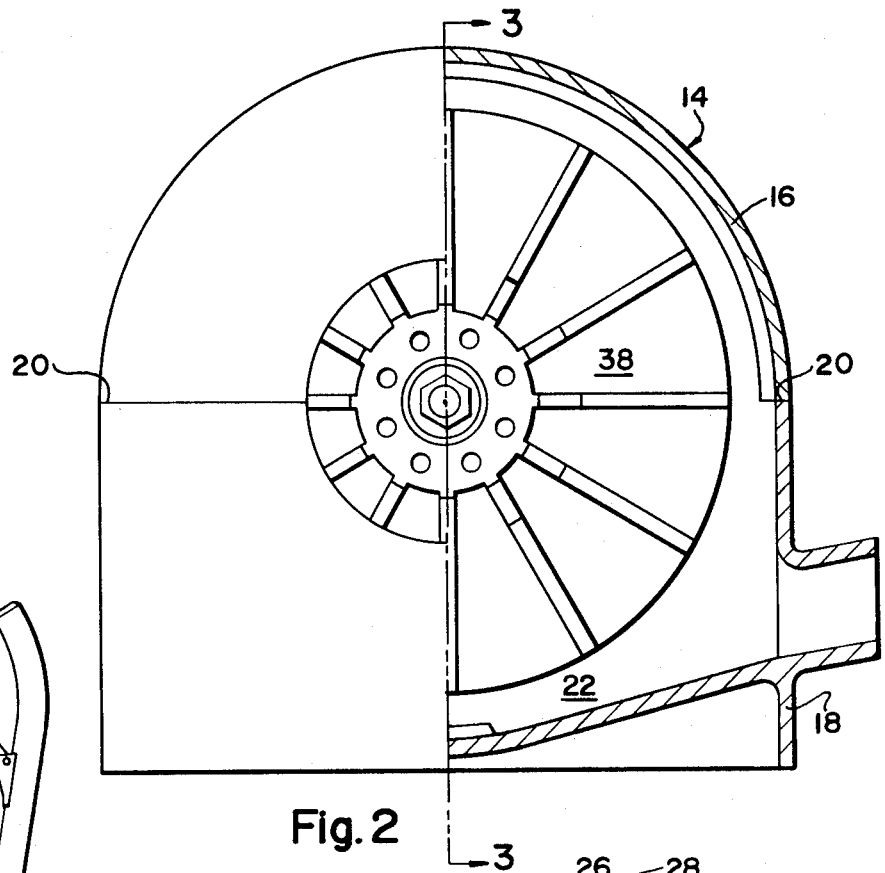
Fig. 2
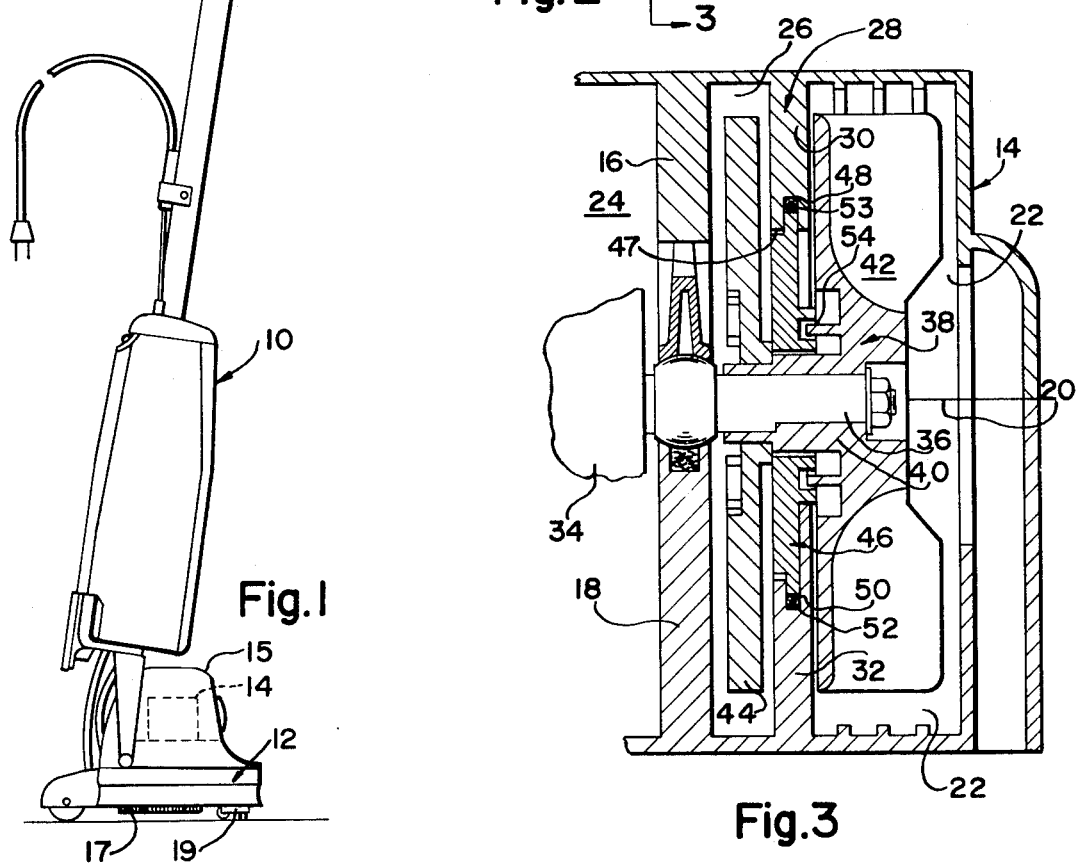
Fig. 1
Fig. 3

MOTOR-PUMP SHAFT SEAL

BACKGROUND OF THE INVENTION

1. Field of the Invention

This invention relates to an integral motor-pump and more particularly to an electrically driven motor-pump for a wet pickup suction nozzle of an ambulatory floor conditioner wherein the pump chamber is sealed, particularly from the motor chamber.

2. Description of the Prior Art

In prior integral motor-pumps designed to be enclosed in single housings there always had been the problem of sealing the pump chamber, and particularly the barrier wall separating the electrical motor chamber from the pump chamber to prevent water or other fluids from seeping across into the motor chamber. A previous design of sealing the motor-pump unit is illustrated and discussed in U.S. Pat. No. 3,407,994 titled "Shaft Seal" by Jack R. McKinney and assigned to The Hoover Company. In that patent a circular disc is rotatably mounted on a pump-fan unit that is in turn rigidly secured on the motor shaft. The disc, journaled between the pump impeller and the motor-cooling fan, is sealed in a peripheral groove in a circular aperture in the barrier wall dividing the interior of the housing. Semicircular portions of the aperture are formed in cooperating web portions of each of the two housing sections.

The two intersections of the periphery of the circular disc with the planar parting line of the web portions, making up the barrier wall, proved to be one of the problem areas in sealing the pump chamber, particularly when it was determined that it was advisable to utilize a solid elastomeric sealing means between all mating surfaces of the pump chamber, rather than the liquid sealant that had originally been contemplated. The intersections of the planar parting line of the housing sections and the circular central aperture being 90° resulted in leakage at this point.

Furthermore, shifting of the circular disc member in the aperture, caused by improper alignment during assembly, or by the forces of the moving parts during operation, would on occasion allow leakage around the edges thereof over a large area.

SUMMARY OF THE INVENTION

A sealing arrangement of the pump chamber of an integral motor-fan having first and second housing sections with integral webs defining a pump chamber barrier wall. The housing sections have contacting peripheral planar mating surfaces except across a portion of the barrier wall in which a central aperture is formed. The aperture is defined by an opening extending into the internal web of each of the housing sections. A continuous groove is formed in the mating peripheral surface of each of the housing sections, surrounding the pump chamber, and the peripheral or boundary edge of the opening in the respective internal web. The intersections of each of the grooved portions of the aperture and the grooves extending across the planar surface portions of the internal web portion are at angles substantially greater than 90°.

A disc member is rotatably journaled on a unit spanning the barrier wall. The contours of the grooved portions of the aperture conform to the shape of the disc which is received therein. A substantially continuous sealing means is fitted in each of the grooves whereby the sealing means in the opposing groove is in abutting contact with the exception of the area of the central aperture where the disc is interposed between the sealing means of the first and second housing sections.

BRIEF DESCRIPTION OF THE DRAWINGS

FIG. 1 is an elevational view of a representative floor conditioner in which the motor-pump of the present invention is utilized.

FIG. 2 is an end view, in partial section, showing the pump chamber of the integral motor-pump.

FIG. 3 is a side elevational view taken on the line 3-3 of FIG. 2.

DESCRIPTION OF THE PREFERRED EMBODIMENT

Figure 4:
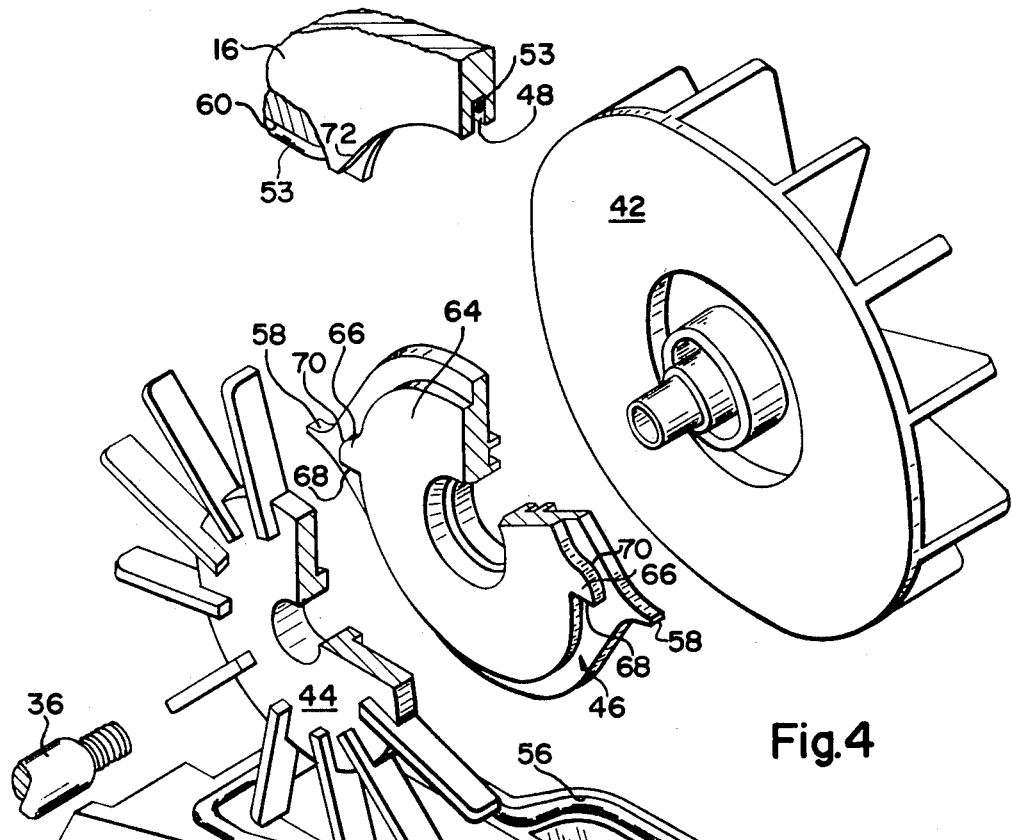
FIG. 4 is an exploded isometric view of the integral motor-pump showing the elements of the present invention.

Referring now the drawings, FIG. 1 shows a floor conditioner generally designated 10 having a working head 12 with a motor-pump housing generally designated 14 mounted thereon within an outer shell 15. Beneath the working head 12 is a pair of rotary brushes 17 (only one shown) driven by the motor of the motor-pump housing 14 and a wet pickup suction nozzle 19 connected to the inlet of the pump in the motor-pump housing 14.

Looking to FIGS. 2 and 3 the motor-pump housing 14 generally consists of first and second housing sections 16 and 18 which separate on a planar parting line 20. The interior of the housing is divided into two major chambers, a pump chamber 22 and a motor chamber 24, the motor chamber having a cooling-fan area 26. Separating the pump chamber 22 from the motor chamber 24 is a barrier wall, generally designated 28, having integral webs 30 and 32 formed in the first and second housing sections 16 and 18, respectively.

A motor 34 is mounted in the motor chamber 24 and has a driven shaft 36 extending through the barrier wall 28 and into the pump chamber 22. An impeller-fan unit 38, rigidly mounted on the shaft 36, has a coaxial tubular portion 40 spanning the barrier wall 28. Formed integrally with the impeller-fan unit 38 is a fluid pump impeller 42 located in the pump chamber 22. A motor-cooling fan 44 is spin welded in place in the reduced inner end of the tubular extension 40 and is located in the motor-fan cooling area 26 of the motor chamber 24. A sealing disc 46 is loosely mounted on the tubular extension 40, between the impeller 42 and the motor-cooling fan 44, and is received in a generally circular, central aperture 47 formed between the internal webs 30 and 32 of the barrier wall 28. The sealing disc 46 is first mounted on the tubular extension 40 and the fan 44 is then spin welded in place on the tubular extension 40, to form the complete impeller-fan unit prior to the assembly of the motor-pump unit in the housing 14. The sealing disc 46 extends into peripheral groove portions 48 and 50 in the peripheral or boundary edge of central aperture 47. In the bottoms of the groove portions 48 and 50, below the periphery of the sealing disc 46, elastomeric sealing means 53 and 52 respectively, are inserted during assembly, as will be discussed with respect to FIGS. 4 and 5.

Looking specifically at FIG. 3, it is seen that fluid in the pump chamber 22 is prevented from entering the motor chamber 25 by a labyrinth seal 54 formed between cooperating portions of the pump impeller and the loosely mounted sealing disc 46 in conjunction with the sealed mating portions of the sealing disc 46 and the barrier wall 28. The labyrinth seal 54 forms no part of the present invention.

Figure 5:
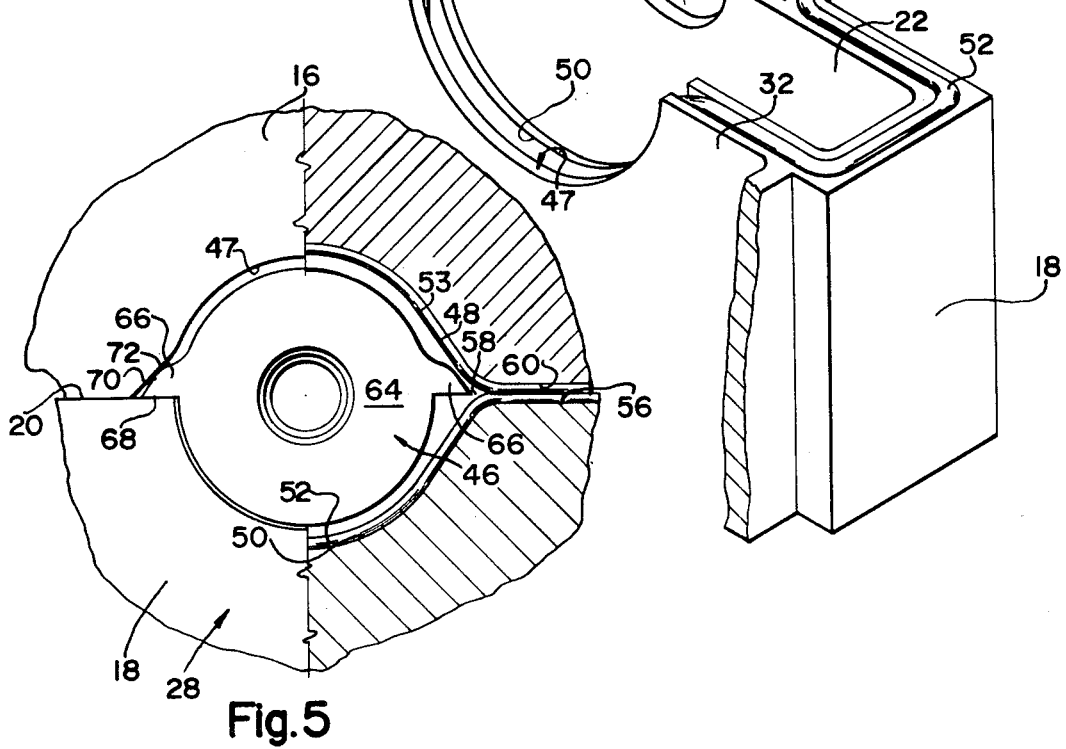
FIG. 5 is a partial sectional elevational view of the sealing disc mounted in the barrier wall when the housing sections of the integral motor-pump are assembled.

FIGS. 4 and 5 illustrate the configuration of the sealing disc which aids in the positive sealing of the pump chamber 22. It can be seen in FIG. 4 that a continuous peripheral groove 56 is formed in a portion of the planar mating surface of the second, or lower, housing section 18 around the pump chamber 22. The groove 56 is connected to both ends to the groove portion 50 in the periphery or boundary edge of the opening in the web 32 forming a part of the aperture 47, to make a composite groove which fully surrounds the pump chamber 22. The elastomeric sealing means 52 is of uniform thickness and extends completely around the pump chamber in the groove 56. The groove portion 50 in the periphery or boundary edge of the aperture 47 is deep enough so that the sealing means 52 does not entirely fill the groove, while the groove 56 formed in the planar mating surface is shallower so that the elastomeric sealing means extends slightly above the parting line 20, when not under compressive force.

The sealing disc 46 is generally circular with diametrically opposed extensions 58. The opposed peripheral surfaces of each of the tapered extensions 58 are concavely tapered to form a generally continuous, smooth transition between the circular disc 46 and the planar parting line 20. The transitional ends of the groove portion 50, in the housing section 18, at the intersections of the planar mating surfaces and the opening in the web 32 are shaped so as to be complementary to the concavely tapered peripheral surfaces of the overlying tapered extensions 58. The angle of intersection between each of the transition portions of the grooves and the adjacent planar portions is far greater than 90°.

The first, or upper, housing section 16 has a continuous groove 60 formed in a portion of its planar mating surface around the pump chamber 22. The groove 60 is connected at both its ends to the groove portion 48 in the periphery or boundary edge of the opening in the web 30 to form a composite groove which fully surrounds the pump chamber 22. The groove portion 48 is deep enough so that the sealing means 53 does not entirely fill the groove portion, while the groove 56, formed in the planar mating surface, is shallower so that the elastomeric sealing means extends slightly above the parting line when not under compression. The transitional ends of the groove portion 48, in the housing section 16, at the intersections of the planar mating surfaces and the opening in the web 30 are shaped so as to be complementary to the concavely tapered peripheral surfaces of the underlying tapered extensions 58. On the right-hand side of FIG. 5, the outer surface of the barrier wall 28 has been removed so as to display the configuration of the intersections of the groove portion 50 with groove 56, and groove portion 48 with groove 60. The interrelationship between the sealing disc 46, and the housing sections 16 and 18, is also illustrated.

The sealing disc 46 has an axially offset, decreased diameter, circular portion 64 which is just slightly smaller than the generally circular aperture 47. A pair of diametrically opposed locating ears 66 are formed on the circular portion 64. Each ear has a lower flat 68 and an upper opposed arcuate surface 70. The flats 68 are coincident with an imaginary plane which would intersect the axis of the sealing disc 46 and bisect the tapered extensions 58. As seen at the left-hand side of FIG. 5, the flats 68 of the ears 66 lie directly on the planar peripheral surface of the lower housing section 18, on either side of central aperture 47. The arcuate surfaces 70 of the ears 66 are in line contact with cutaway planar sections 72 of the upper housing section 16 formed at the junction of the aperture 47 and the planar mating surface.

Generally, the abutting of the flats 68 with the peripheral mating surfaces of the lower housing 18 locates the sealing disc 46 in the vertical direction. The contacting of the cutouts 72 with the arcuate surfaces 70 of the ears tends to press the flats 68 down tightly against the planar peripheral surface of the lower housing 18 and to locate the disc 46 centrally in the horizontal direction.

We claim:
1. A integral motor-pump comprising:
   a. mating first and second housing sections defining a pump chamber and a motor chamber separated by a barrier wall consisting of internal webs in each of said housing sections, said first and second housing sections having mating peripheral surfaces surrounding said pump chamber including peripheral surfaces of said webs;
   b. a central aperture in said barrier wall, said aperture being defined by an opening extending into said internal webs in each of said first and second housing sections, resulting in an interruption of the mating of said peripheral surfaces of said housing section surrounding said pump chamber;
   c. a continuous groove formed in said mating peripheral surfaces of each of said first and second housing sections, surrounding said pump chamber, including said web, the ends of said continuous groove being connected across said opening in said internal web;
   d. said groove portions in each boundary edge of said openings being connected to said ends of said continuous grooves in said mating peripheral surfaces of said internal webs at angles substantially greater than 90°;
   e. a rotatably unit spanning said barrier wall through said aperture;
   f. a generally circular disc journaled on said rotatably unit and complementarily received in said groove portions of said openings in said housing sections, said disc having a pair of diametrically opposed tapered extensions fitting with the ends of said groove portions of said housing section openings and such end groove portions being shaped to conform to said disc tapered extensions to form a smooth transition between said groove portions of said housing section openings and said grooves in said housing section generally planar mating peripheral surfaces;
   g. a substantially continuous sealing means positioned in each of said grooves of each of said first and second housing sections whereby said sealing means in said continuous grooves are in abutting contact with each other except in the area of said aperture where said disc is interposed between sealing means of first and second housing sections.

2. An integral motor-pump as recited in claim 1 wherein said disc includes axially offset diametrically opposed ears, each of said ears having a flat, said flats being located in a single plane, said flats lying on the planar surfaces of one of said webs, adjacent opposite sides of said respective opening, each of said ears has an arcuate surface opposed to a respective flat, said arcuate surfaces being in line contact with planar cutouts at opposite sides of said opening in said other of said webs whereby said sealing disc is positively located.

3. An integral motor-pump as recited in claim 1 wherein said groove portions in said boundary edges of said openings are deeper than said grooves in said mating peripheral surfaces of said upper and lower housing sections, said sealing means being of an elastomeric material of substantially uniform thickness, the thickness of said sealing means being such that when said sealing means is fitted in said grooves it extends above said mating peripheral surfaces, at least when said sealing means is not being compressed, and when said sealing means is in said groove portions in said openings it does not entirely fill said groove portions even when said sealing means is not compressed.

4. An integral motor-pump as recited in claim 1 wherein said disc includes axially offset diametrically opposed ears, each of said ears having a flat, said flats being in a plane which bisects said tapered extensions, said flats lying on planar surfaces of one of said webs, adjacent said respective opening, an arcuate surface on each of said ears opposed to said respective flat, said arcuate surfaces being in line contact with planar cutouts at opposite sides of said opening in said other of said webs whereby said sealing disc is positively located.

5. An integral motor-pump as recited in claim 1 wherein each of said extensions is concavely tapered on opposing peripheral edges.